United States Patent Office 3,346,254
Patented Oct. 10, 1967

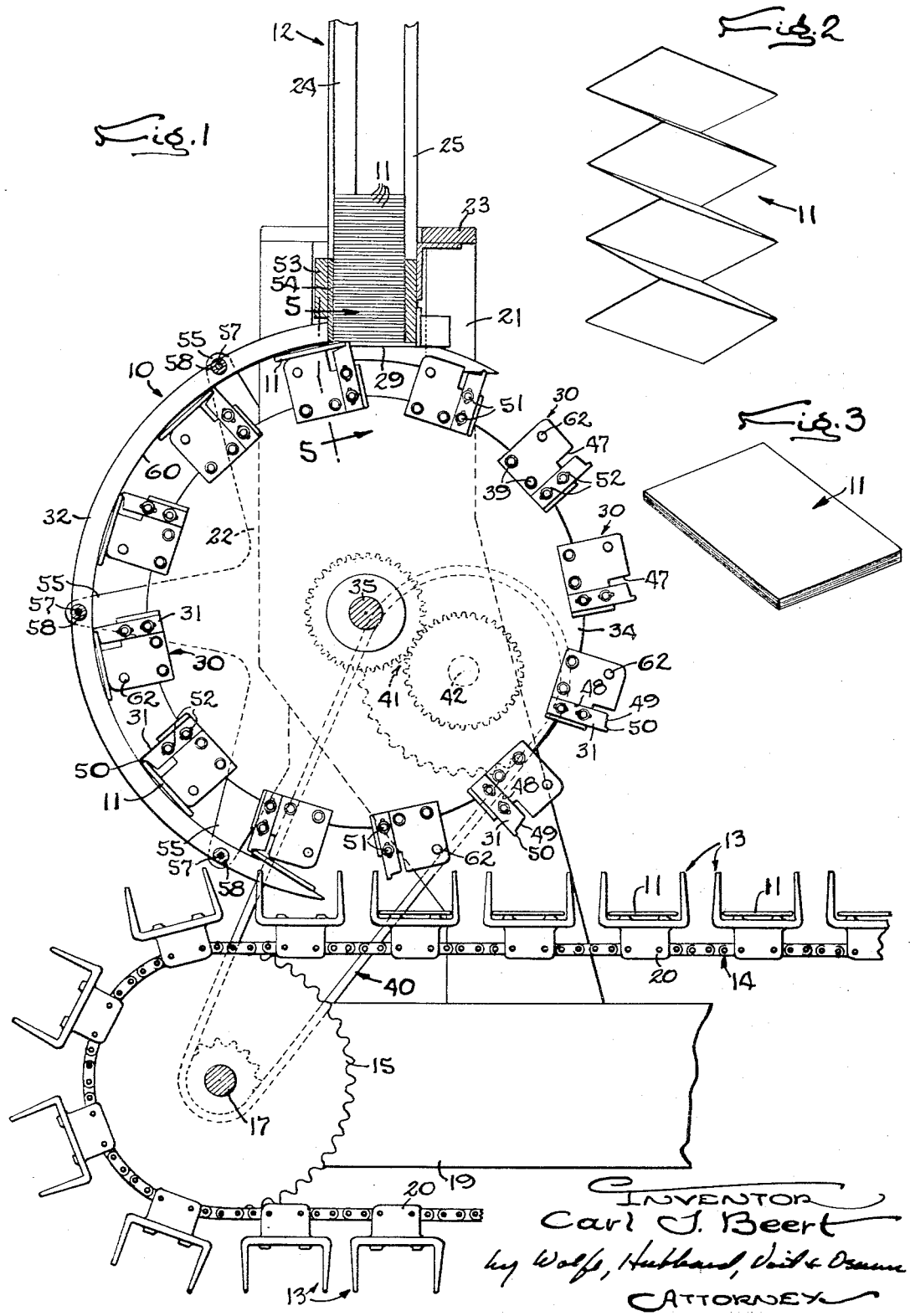

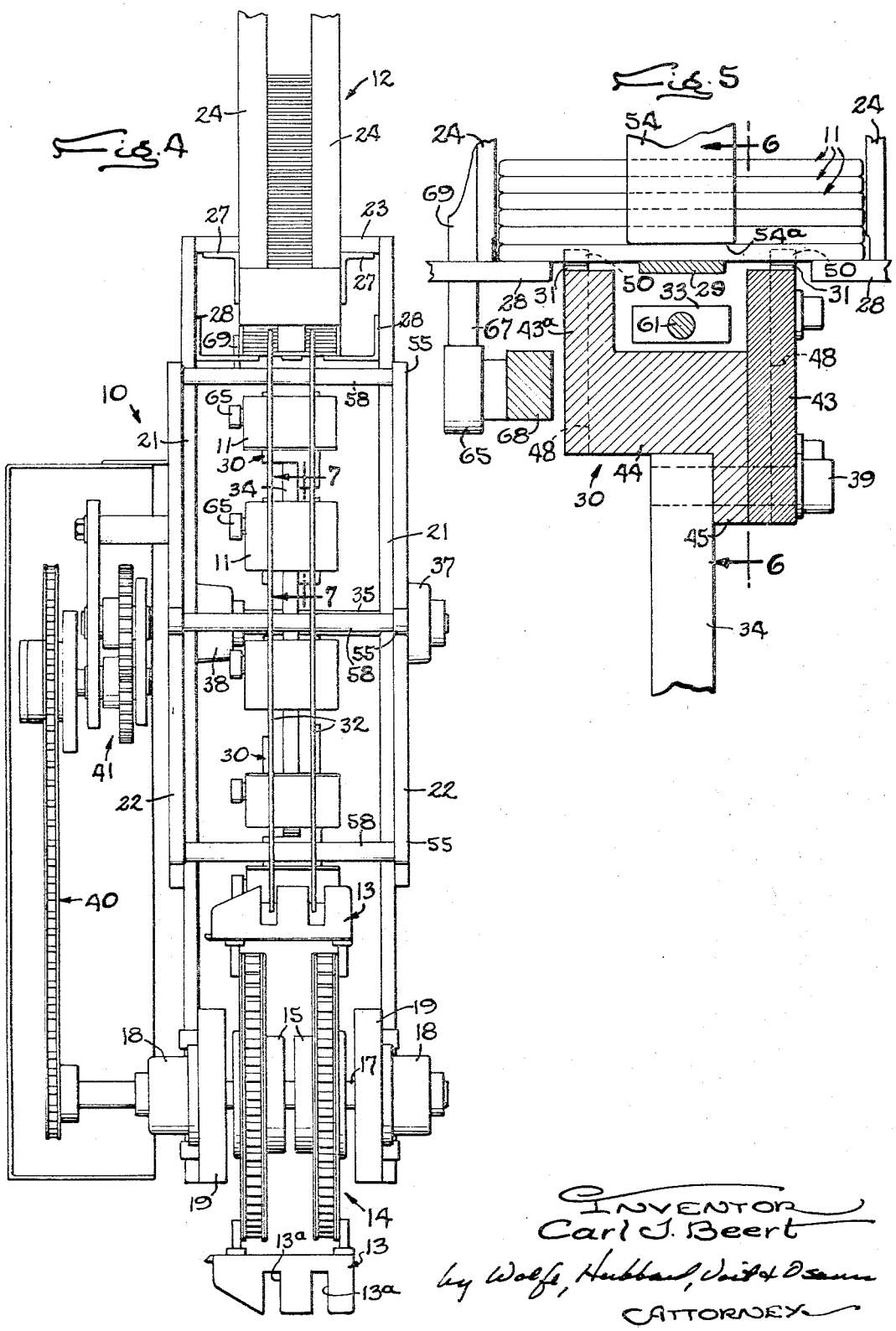

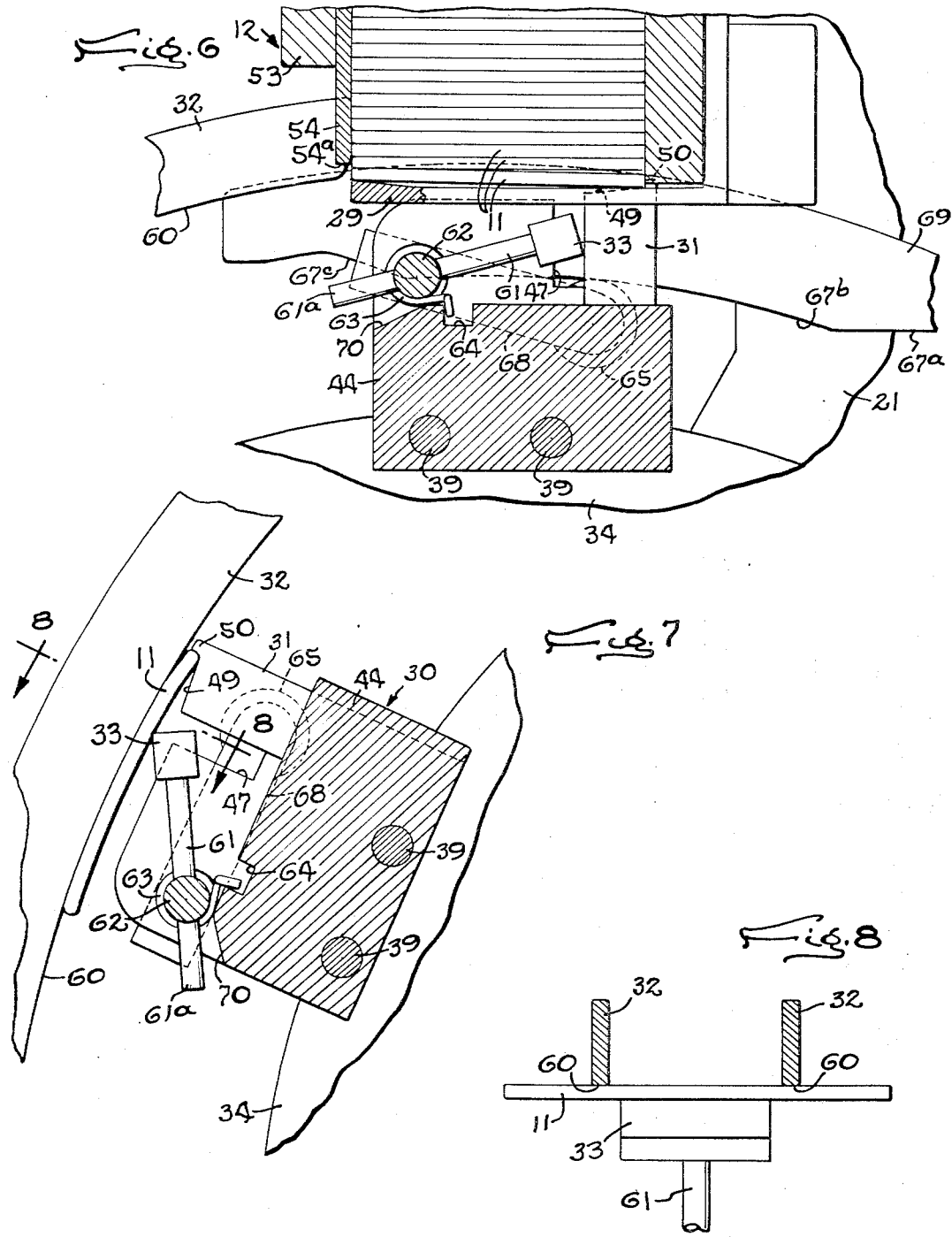

3,346,254
APPARATUS FOR REMOVING PACKETS
FROM A STACK
Carl J. Beert, Rockford, Ill., assignor to Bartelt Engineering Company, Inc., Rockford, Ill., a corporation of Delaware
Filed July 8, 1965, Ser. No. 470,484
11 Claims. (Cl. 271—41)

ABSTRACT OF THE DISCLOSURE

Apparatus for removing folded coupons one by one from the bottom of a stack in a magazine and transferring the coupons to, and inserting them in, upwardly opening buckets spaced along a conveyor. The apparatus comprises a wheel journaled on the machine frame below the magazine and having a series of angularly spaced carriers formed with pick-off fingers engageable with an edge of the bottom coupon to shift the coupon out of the magazine as the carrier passes beneath the magazine. Also mounted on each carrier is a cam-operated, spring-loaded presser which engages the removed coupon and holds it against an arcuate guide following the path of the carrier from the magazine to the release point adjacent the conveyor.

---

This invention relates to an apparatus for removing packets one by one from the magazine of an automatic packaging machine and transferring the packets to a discharge point for insertion in a receptacle, and is particularly adapted for the feeding of folded coupons from a supply stack and delivering the coupons to a conveyor for incorporation in stacks of packages to which the printed material on the coupons relates.

The general object of the present invention is to provide an improved and simplified apparatus of the foregoing character capable of separating successive packets of substantial thickness, such as multifolded coupons, from a stack at high speed and transferring the coupons to the discharge point while maintaining the coupons under control at all times.

A more detailed object is to utilize a wheel having a plurality of carriers angularly spaced around its periphery to move in succession past the end of the magazine, pick off successive terminal packets in the magazine with a quick and free-sliding edgewise motion of the packets, and positively support the packets in a novel manner as they are carried to the discharge point.

Another object is to provide a novel mechanism for engaging and holding the packets after they have been separated from the stack.

A further object is to provide a simple gate cooperating with the carriers to separate successive packets quickly and smoothly from the stack.

Still another object is to provide automatic pick-off and supporting mechanism on the carriers of relatively simple construction and capable of quick and trouble-free operation.

Another object is to utilize the supporting mechanism to obtain positive guiding of the packets away from the carriers at the discharge point.

Yet another object is to separate the packets from the stack in a manner that produces a minimum of resistance to such separation and separates the packets at a practically unlimited speed, and then to grip the packets on the carriers quickly and easily for transfer with the carriers to the discharge point.

Other objects and advantages of the invention will become apparent from the following detailed description taken in connection with the accompanying drawings, in which—

FIGURE 1 is a fragmentary front elevation of part of an automatic packaging machine embodying the novel features of the present invention with parts broken away and shown in cross-section.

FIG. 2 is an enlarged perspective view of a partially unfolded coupon adapted to be handled by the improved apparatus.

FIG. 3 is a perspective view of the folded coupon.

FIG. 4 is a fragmentary end view of the machine in FIG. 1.

FIG. 5 is an enlarged fragmentary cross-sectional view taken substantially along the line 5—5 of FIG. 1.

FIG. 6 is a fragmentary cross-section taken along the line 6—6 of FIG. 5

FIG. 7 is an enlarged fragmentary cross-sectional view taken along the line 7—7 of FIG. 4.

FIG. 8 is a fragmentary cross-section taken along the line 8—8 of FIG. 7.

As shown in the drawings for purposes of illustration, the invention is embodied in an apparatus indicated generally at 10 in FIGS. 1 and 4 for removing coupons 11 one by one from a stack supported in a magazine 12 and inserting the coupons in buckets 13 spaced along a conveyor 14 moving beneath the magazine. In such a machine, one or more packages (not shown) are inserted in each bucket either before or after the coupon is delivered to the bucket, for eventual loading of the stacked packages and the coupon into a carton. Herein, the coupons are shown as being placed on the bottoms of the buckets near the upstream end of the conveyor prior to the delivery of packages to the buckets.

The illustrative conveyor 14 comprises a pair of endless chains (see FIG. 4) disposed side by side in vertical planes and trained around horizontally spaced pairs of sprocket wheels 15, only one pair of which is shown, the sprocket wheels being supported on horizontal shafts 17 journaled in bearings 18 on two elongated parallel rails 19 of the machine frame. Equally spaced along the chains are the buckets 13 which are secured to the chains by lugs 20 projecting downwardly from the undersides of the buckets when the latter are on the upper runs of the chains. The buckets are of U-shaped cross-section with open ends and open tops for receiving the coupons 11 from the magazine 12, and are advanced on the upper run of the conveyor from left to right as viewed in FIG. 1.

Each of the illustrative coupons 11 is an elongated paper sheet folded back and forth upon itself zigzag fashion (see FIG. 2) to produce a multilayer packet of rectangular shape and substantial thickness as shown in FIG. 3. A vertical stack of such coupons is supported above the upstream end of the conveyor 14 in the magazine 12 (see FIG. 1) which is mounted on two posts 21 projecting upwardly from the rails 19 and connected across their upper ends by an L-shaped top plate 23 straddling the magazine.

Herein, the magazine 12 is formed by two vertical bars 24 of right-angle cross-section spaced and positioned to receive the corners of the stack on the left side of the latter with a vertical bar 25 engaging the right side of the stack approximately midway between the front and rear corners to hold the stack against the angle bars. The bars 24 and 25 are secured to the top plate 23 and the posts 21 by means of L-shaped brackets 27 and 28 (FIGS. 1 and 4). To hold the stack in the magazine, the brackets 28 project partially under the stack from the front and rear sides thereof, and a toe 29 on the lower end of the bar 25 projects cantilever fashion to the left (FIG. 1) under the center of the stack.

The present invention contemplates a new and improved apparatus 10 for removing the packets 11 one by one from the magazine 12 and transferring the removed packets to a discharge point adjacent the conveyor 14 for insertion in the buckets 13. The apparatus is simple in construction, is operable at extremely high speeds as compared to presently available mechanisms for this purpose, and handles the packets in a relatively simple manner that reduces to a minimum the possibilities of malfunctioning of the apparatus.

To these ends, the apparatus 10 comprises a series of carriers 30 supported for movement along an endless path past the discharge end of the magazine 12 with at least one pick-off member 31 on the trailing portion of the carrier as it moves past the magazine for engaging the terminal packet 11 in the stack and sliding the packet edgewise out of the magazine and along the adjacent side of a guide 32 following the path of the carriers away from the magazine. To maintain control of each packet after its removal from the magazine, each carrier is provided with a presser 33 spaced from the terminal packet during its removal and then movable toward the guide to hold the packet on the carrier and against the guide and thus grip the packet on the carrier as the latter moves the packet away from the magazine toward the discharge point.

In this instance, the carriers 30 are arranged in an annular series and angularly spaced around a wheel 34 in the form of a circular disk rotatably mounted on the machine frame by means of a coaxial horizontal shaft 35 journaled in bearings 37 and 38 on the posts 21 beneath the magazine 12. The carriers are equally spaced around the wheel and fastened thereto by bolts 39 (see FIG. 5) to project outwardly beyond the periphery of the wheel and pass successively beneath the magazine closely adjacent the latter in one direction of rotation of the wheel. Herein, the wheel is rotated counterclockwise as viewed in FIG. 1 in timed relation with the conveyor 14 through an endless-chain connection 40 (FIGS. 1 and 4) with the conveyor shaft 17 and gearing at 41 drivingly connecting an intermediate shaft 42 driven by the chain to one end of the shaft supporting the wheel.

As shown most clearly in FIGS. 5 and 6, each carrier 30 is formed by a pair of side plates 43 and 43a disposed on opposite sides of the plane of the wheel 34 and spaced apart by a block 44 having a lip 45 which projects inwardly along one side of the wheel. The bolts 39 pass through alined holes in the plate 43 and the lip and are threaded into the wheel. The other plate 43a may be integral with the block or formed separately and fastened to the block with screws (not shown). It will be seen in FIGS. 1, 5 and 6 that the forward portions of the side plates project outwardly in spaced relation beyond the top surface of the spacer block, and the trailing portions of the plates are notched at 47. The pick-off members 31 are disposed in these notches and herein are formed by the outer end portions of elongated bars slidably guided in radial grooves 48 in the remote sides of the plates 43 and 43a. The outer ends of the pick-off bars are inclined at 49 (FIGS. 1, 6 and 7) outwardly and rearwardly relative to the direction of movement of the carriers and are formed with radially projecting fingers 50 for engaging the right edge of the bottom coupon in the stack as the carrier passes beneath the magazine. Bolts 51 threaded into the bottoms of the guide grooves 48 through radially elongated slots 52 in the pick-off bars hold the latter in place relative to the carriers and permit precise adjustment of the radial positions of the fingers 50.

On the left side (FIG. 1) of the magazine 12, the lower portions of the angle bars 24 are cut away, leaving the lower portion of the left side open below a horizontal cross plate 53 (FIG. 4) spanning and suitably connected to the angle bars. Depending from this cross plate along the adjacent edges of the coupons is a detent finger 54 having a lower edge 54a (FIG. 6) spaced above the level of the top of the toe 29 a distance greater than the thickness of one coupon but less than the thickness of two coupons. Thus, the detent finger and the toe cooperate to define an escapement gate for the edgewise removal of the bottom coupon to the left from the magazine as the pick-off fingers 50 move across the bottom of the magazine.

The guide 32 herein is formed by a pair of side-by-side arcuate ring sections (see FIGS. 4 and 8) more closely spaced than the width of the coupons 11 and turning through almost 180 degrees from the bottom of the magazine 12 above the gate to a point above the upstream end of the conveyor 14. The rings are supported adjacent each end and near their midpoints on the plates 22 which are bolted to the posts 21 and formed with three angularly spaced arms 55 secured to the rings adjacent the outer ends of the arms by means of bolts 57. Spacers 58 (FIG. 4) hold the guide sections in properly spaced relationship in alinement with the packets with the inner edges 60 of the rings spaced outwardly from the gate (see FIG. 6) to overlie the packets as the latter leave the magazine and slide along the rings.

An important aspect of the invention is the manner of supporting and operating the pressers 33 for holding the individual packets 11 against the guide 32 for movement with the carriers 30 to the discharge point. As shown most clearly in FIGS. 5-8, each presser is a small bar shorter in length than the width of the packets and disposed in the space between the outer portions of the side plates 43 and 43a to pass beneath the bottom packet in the stack generally parallel to the axis of rotation of the wheel 34. The presser bar is supported on one end of a pin 61 which is pivoted adjacent its other end on the carrier by means of a perpendicular pin 62 spanning the side plates and journaled at its opposite ends in alined holes therein. Thus, the presser bars are swingable about the axes defined by the pins 62 from the retracted position shown in FIG. 6 counterclockwise and outwardly toward an extended position.

A torsion spring 63 is coiled around each pivot pin 62 with one of its ends anchored in a recess 64 (FIG. 6) in the spacer block 44 and its other end acting on the supporting pin 61 to swing the presser bar 33 counterclockwise toward its extended position. To hold the presser bars in the retracted position in passing beneath the magazine 12, a follower 65 mounted on and movable with each presser bar engages a stationary cam 67 as the associated carrier approaches the magazine, the cam being shaped to move the follower in a direction to retract the associated presser bar against the action of the spring 63 until a packet has been removed from the magazine. Then the cam releases the follower for outward movement of the presser bar by the spring to press the packet against the guide 32.

In this instance, the followers 65 are rollers journaled on the free ends of arms 68 fast on the ends of the pivot pins 62 beyond the side plates 43a and projecting rearwardly from the pivot pins, each arm being in a preselected and fixed angular relation with the associated presser bar and supporting pin 61. The cam 67 is the underside of a cam plate 69 supported on the post 21 along one side of the path of the carriers 30 approaching the magazine and projecting to the right (FIGS. 1 and 6) from the latter in position to engage the approaching follower rollers 65 before the associated presser bars 33 move beneath the magazine. The right end portion 67a of the cam surface first engages the passing rollers and presses them downwardly to swing the rollers and the presser bars clockwise about the pivot pins into the retracted position shown in FIG. 6. The intermediate portion 67b of the surface holds the presser bars in this retracted position as they pass beneath the magazine and the fingers 50 slide a packet 11 through the gate, and the left end portion 67c of the surface is shaped to release the rollers as the bars pass the gate and move under the end of the guide 32. Thus, each presser bar is released and spring-pressed against the removed packet to hold the latter against the guide edges 60 and cooperate with the fingers 50 in advancing the coupon on the carrier along the guide to the discharge point.

It will be seen that the packets 11 are removed quickly and easily from the magazine 12 with a simple edgewise sliding motion resisted only by the friction produced as a result of the weight of the stack thereon, and that the speed of removal is limited only by the rate at which gravity advances the stack and the impact that the trailing edges of the coupons will sustain without objectionable deformation. After each coupon is removed, it is held positively on the carrier under the control of the fingers 50 by the presser bars 33 during the transfer along the guide edges 60. In practice, the apparatus has been operated at speeds on the order of 300 coupons per minute, and there is no apparent reason why substantially higher speeds may not be used.

Near the lower ends of the guide ring sections, the guide edges 60 extend generally tangentially outwardly and downwardly relative to the path of the carriers 30 to guide the coupons 11 away from the carriers and into the passing conveyor buckets 13, the side walls of which are notched at 13ª as shown in FIG. 4 to straddle the lower ends of the guide sections. As the presser bars 33 move along this portion of the guide, they swing progressively outwardly to hold the coupons against the guide edges and push them into the buckets as the bars pass the end of the guide. This motion feeds the coupons smoothly into the passing buckets and releases them therein. Outward motion of the presser bars is limited by an abutment 70 on each spacer block 44 for engaging the supporting pin 61 and thus determining the fully extended position of the presser bar. Herein, the abutments are formed by the bottoms of notches (see FIG. 6) in the blocks alined with the end portions 61ª of the pins opposite the presser bars so that the pins swing into the notches as the presser bar swings outwardly.

From the foregoing, it will be seen that the apparatus 10 slides successive packets 11 from the magazine 12 with a quick and simple edgewise motion as a result of engagement of the passing pick-off fingers 50 with the edges of the bottom packet remote from the escapement gate. As soon as the associated presser bar 33 is past the bottom of the magazine, the bar may be released for movement toward the removed packet and the guide 32 to press the packet against the guide for movemen along the latter with the carrier at high speed. Thus, each packet is removed quickly and smoothly from the magazine, gripped in its position above the carrier and positively held in place thereon, and pushed along the guide to the point of discharge.

I claim as my invention:

1. Apparatus for feeding packets one by one from a stack having, in combination, a magazine for supporting a stack of packets in an upright position and having a gate on one side of the lower end of said stack for the edgewise removal of successive bottom packets from the stack, a wheel disposed beneath said magazine and supported for rotation in a generally vertical plane, a plurality of carriers mounted on and angularly spaced around the periphery of said wheel to pass successively beneath said magazine in one direction of rotation of the wheel, each of said carriers moving beneath the magazine toward said one side in said one direction of rotation, at least one pick-off finger on the trailing side of each carrier projecting upwardly therefrom to engage the edge of the bottom packet in said stack and push the packet through said gate as the carrier passes beneath said magazine, an elongated arcuate guide spaced radially outwardly from said carriers and having one end adjacent said gate and its other end spaced engularly from the gate, a presser bar mounted on each carrier and disposed between the latter and the bottom packet as the carrier passes beneath said magazine, means supporting said presser for movement from a retracted position radially outwardly to an extended position, and means for holding each presser in said retracted position as the associated carrier moves beneath said magazine to remove a packet therefrom and then moving the presser outwardly toward said extended position to grip the packet between the carrier and said guide as the carrier moves along the guide.

2. Apparatus for removing packets one by one from a stack having, in combination, a magazine for supporting an upright stack of packets in side-by-side relation and having a gate on one side of the lower end of said stack for edgewise removal of successive packets from the lower end of the stack, a wheel rotatably mounted beneath the stack with the periphery of the wheel adjacent said lower end, a plurality of carriers angularly spaced around and movable with said wheel, means for rotating said wheel in a direction to move said carriers successively beneath said lower end moving toward said gate, at least one pick-off finger on the trailing portion of each carrier projecting upwardly therefrom as the carrier passes said lower end and positioned to engage the edge of the lower packet in said stack opposite said gate thereby to push the packet edgewise away from said stack through said gate above the carrier, an elongated guide having an arcuate guide edge spaced radially outwardly from said carrier and said gate and extending along the path of the carriers away from the gate whereby each packet removed from said stack is disposed between a carrier and said guide edge, a pressure mounted on each carrier for movement outwardly from a retracted position beneath and spaced radially inwardly from the removed packet, and means for holding each presser in said retracted position as the associated carrier passes beneath said magazine and shifting the presser outwardly to hold the removed packet against said guide edge after the carrier passes the magazine thereby to carry the packet along said guide away from the magazine.

3. The combination defined in claim 2 in which said pick-off fingers are supported on said carriers for selective radial adjustment relative thereto.

4. The combination defined in claim 2 in which the lower portion of said one side of said magazine is open, and said gate is defined by a detent having a lower end spaced from the bottom of said stack a distance greater than the thickness of one of said packets and less than the thickness of two packets.

5. The combination defined in claim 4 in which the bottom of said stack is supported on a toe projecting cantilever fashion toward said one side and spaced below said detent.

6. The combination defined in claim 2 in which said pressers are bars pivoted on said carriers for inward and outward swinging and spring-urged outwardly toward extended positions.

7. The combination defined in claim 6 in which said holding means comprise a follower mounted on each carrier for movement with the presser bar thereon, and a cam stationarily mounted along the path of said carriers and positioned to engage each follower as the latter approaches said magazine, said cam being shaped to move said followers in a direction to retract said bars before the latter move under said magazine, hold the bars retracted until the latter pass the magazine, and then release the bars for movement toward said extended position to press the removed packets against said guide edge.

8. The combination defined in claim 2 in which said guide terminates at a discharge point angularly spaced from said gate, and said guide edge is inclined outwardly and generally tangentially relative to the carrier path adjacent said discharge point to guide the brackets away from said carriers.

9. The combination defined in claim 8 in which said pressers are spring-pressed against said packets and said guide edge to feed the packets outwardly adjacent said discharge point.

10. Apparatus for removing packets one by one from a stack having, in combination, a magazine for supporting the stack of packets in side-by-side relation and having a gate on one side of one end of the stack for edgewise removal of packets from said stack, an annular series of carriers, means supporting said carriers to revolve along an annular path past said one end moving toward said gate, a pick-off member on each carrier for engaging the terminal packet in said stack and shifting the packet edgewise through said gate, a guide spaced radially outwardly from and following the path of said carriers away from said magazine, a presser mounted on each carrier for movement thereon from a retracted position outwardly to an extended position, means yieldably urging said pressers toward said extended positions, a follower mounted on and movable with each presser, and a stationary cam positioned along the path of said carriers for engagement with successive followers passing said magazine, said cam being shaped to engage each follower approaching said magazine and move the follower in a direction to retract the associated presser, then hold the presser in the retracted position as a packet is removed from the magazine by the carrier, and then release said follower for outward movement of the presser toward said guide to hold the packet against the guide.

11. Apparatus for removing packets one by one from a stack having, in combination, a magazine for supporting the stack of packets in side-by-side relation and having a gate on one side of one end of the stack for edgewise removal of successive packers from said stack, an annular series of carriers, means supporting said carriers to revolve along an annular path past said one end moving toward said gate, a pick-off member on each carrier for engaging the terminal packet in said stack and shifting the terminal packet edgewise through said gate, a guide spaced radially outwardly from and following the path of said carriers away from said magazine, a presser mounted on each carrier for movement thereon from a retracted position outwardly to an extended position, and means for holding each presser in the retracted position as the associated carrier passes said magazine and shifts a packet through said gate and then moving said presser outwardly to press the packet against said guide as the carrier moves away from the magazine.

References Cited

UNITED STATES PATENTS

| | | | |
|---|---|---|---|
| 1,289,238 | 12/1918 | Onderdork | 83—154 X |
| 2,265,191 | 12/1941 | Peters | 271—10 |
| 2,379,361 | 6/1945 | Bombard | 271—41 |
| 3,108,799 | 10/1963 | Clemens et al. | 271—35 X |

M. HENSON WOOD, JR., *Primary Examiner.*

ALLEN N. KNOWLES, *Examiner.*